US012380173B2

(12) United States Patent
Saxberg et al.

(10) Patent No.: US 12,380,173 B2
(45) Date of Patent: Aug. 5, 2025

(54) INTERACTIVE VALIDATION OF FREEFORM ENTRIES IN WEB FORMS

(71) Applicant: Google LLC, Mountain View, CA (US)

(72) Inventors: Kyle Filip Haug Saxberg, Mountain View, CA (US); Amit Roy, Sunnyvale, CA (US); Scott Joseph Blessing, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/528,234

(22) Filed: Dec. 4, 2023

(65) Prior Publication Data

US 2025/0181655 A1   Jun. 5, 2025

(51) Int. Cl.
    *G06F 16/953* (2019.01)
    *G06F 40/20* (2020.01)
(52) U.S. Cl.
    CPC ............ *G06F 16/953* (2019.01); *G06F 40/20* (2020.01)
(58) Field of Classification Search
    CPC .................. G06F 16/953; G06F 40/20
    See application file for complete search history.

(56) References Cited

U.S. PATENT DOCUMENTS

| | | | | |
|---|---|---|---|---|
| 7,188,073 B1* | 3/2007 | Tam | ........................ | G06Q 10/02 705/5 |
| 7,720,674 B2* | 5/2010 | Kaiser | ............... | G06F 16/24522 704/7 |
| 9,063,975 B2 | 6/2015 | Isensee et al. | | |
| 10,642,928 B2 | 5/2020 | Allen et al. | | |
| 11,093,835 B2 | 8/2021 | Baughman et al. | | |
| 11,940,986 B1* | 3/2024 | Kocaman | ............... | G06F 16/258 |
| 2001/0011246 A1* | 8/2001 | Tammaro | ............... | G06Q 20/10 705/38 |
| 2007/0133876 A1* | 6/2007 | Chande | ................. | G06F 40/174 382/181 |
| 2011/0010367 A1* | 1/2011 | Jockish | .................. | G06Q 10/10 715/764 |
| 2011/0066587 A1 | 3/2011 | Ferrucci et al. | | |
| 2015/0310527 A1* | 10/2015 | Warren | .............. | G06Q 30/0623 705/26.62 |
| 2015/0356446 A1* | 12/2015 | Greystoke | .......... | G06Q 30/0282 706/11 |

(Continued)

OTHER PUBLICATIONS

Luke Wroblewski, "Inline Validation in Web Forms", pp. 1-37 (Year: 2009).*

*Primary Examiner* — Jared M Bibbee
(74) *Attorney, Agent, or Firm* — Lerner David LLP (57) ABSTRACT

This technology generally relates to techniques for validating freeform entries in web forms, such that providers of a service can receive an optimal amount of information from potential users of that service in the initial correspondence. The techniques may include receiving a query from a consumer and analyzing the query using natural language parsing of a machine learning model, such as a large language model. The machine learning model may generate a series of prompts related to the content of the query. The user may provide additional information based on the series of prompts. The techniques may further include analyzing the additional information to determine if the prompts were addressed. If the prompts were addressed, the techniques may include outputting a complete message to the user.

20 Claims, 8 Drawing Sheets

(56) References Cited

U.S. PATENT DOCUMENTS

| | | | |
|---|---|---|---|
| 2016/0188718 A1* | 6/2016 | Inoue | G06F 16/3331 |
| | | | 707/706 |
| 2016/0239614 A1* | 8/2016 | Siva | G06F 16/24575 |
| 2022/0189623 A1* | 6/2022 | Breitweiser | G16H 40/67 |
| 2022/0374956 A1* | 11/2022 | Jungmeisteris | G06F 3/0482 |
| 2024/0013928 A1* | 1/2024 | Khan | G16H 50/20 |
| 2024/0274291 A1* | 8/2024 | Basu | G16H 50/70 |
| 2025/0103622 A1* | 3/2025 | Addanki | G06F 16/3329 |

* cited by examiner

INTERACTIVE VALIDATION OF FREEFORM ENTRIES IN WEB FORMS

BACKGROUND

Web forms are used to collect data. Data can now be quickly processed by artificial intelligence, including machine learning systems. Currently, the preferred way for providers of services to collect the most concise information is through structured inputs, such as radio selectors, checkboxes, and multi-select options. However, to gather all of the necessary information from users, the structured data forms can become long and cumbersome, and shorter forms are preferred by users.

There also may be a limit to what can be included in the structured forms. Freeform entry options allow for a wide variety of information to be submitted. However, there is little to no verification of whether the information within the free form entry is useful to the provider.

BRIEF SUMMARY

This technology generally relates to techniques for validating freeform entries in web forms, such that providers of a service can receive an optimal amount of information from potential users of that service in the initial correspondence. The techniques may include receiving a query from a consumer and analyzing the query using natural language parsing of a machine learning model, such as a large language model (LLM).

The machine learning model may generate a series of prompts related to the content of the query. The user may provide additional information based on the series of prompts. The techniques may further include analyzing the additional information to determine if the prompts were addressed. If the prompts were addressed, the techniques may include outputting a confirmation message to the user. The techniques allow for the user of the service to more effortlessly submit a desirable amount of information to the provider of the service.

In one aspect, the disclosure relates to a method for processing freeform data entry on web forms. The method may include receiving a user selection of a provider, receiving from a user a query associated with a request for a service, wherein the query is presented as a freeform entry, generating at least one prompt that corresponds to the query using a machine learning model, wherein the at least one prompt requests supplemental details related to the query from the user, outputting the at least one prompt to the user, receiving, in response to the at least one prompt, additional information from the user, determining using the machine learning model that the additional information does not address the at least one prompt, in response to determining the additional information does not address at least one aspect of the least one or more prompts, outputting at least one of the at least one prompt that remains unaddressed, and submitting the query and additional information to the selected provider. In some embodiments, the method may be carried out on one or more processors.

The method may further comprise determining whether the query associated with a request for a service relates to the one or more services provided by the selected provider. The method may further comprise, in response to determining the query does not relate to the one or more services provided by the selected provider, rerouting the user to a search engine. The method may further comprise, in response to determining the query does not relate to the one or more services provided by the selected provider, rerouting the user to another provider. The method may further comprise, in response to determining the query does relate to the one or more services provided by the provider, outputting a confirmatory signal.

In some embodiments, the method may further comprise outputting a message to the user based on whether the additional information addresses the at least one prompt. In some examples, the message may contain one or more prompts of the at least one prompt that remain unaddressed by the query and the additional information. In some examples, the message may contain a confirmation notification.

In some embodiments, the machine learning model may be a large language model. In some embodiments, the machine learning model generates at least one prompt using a list of predetermined prompts for a provider of one or more services.

According to aspects of the disclosure, the disclosure relates to a system comprising one or more processors configured to receive a user selection of a provider, receive from a user a query associated with a request for a service, wherein the query is presented as a freeform entry, generate at least one prompt that corresponds to the query using a machine learning model, wherein the at least one prompt requests supplemental details related to the query from the user, output the at least one prompt to the user, receive, in response to the at least one prompt, additional information from the user, determine using the machine learning model that the additional information does not address the at least one prompt, in response to determining the additional information does not address at least one aspect of the least one or more prompts, output at least one of the at least one prompt that remains unaddressed, and submit the query and additional information to the selected provider.

In some embodiments, the system may further include one or more processors configured to determine whether the query associated with the request for a service relates to one or more services provided by the provider. The one or more processors may be further configured to, in response to determining the query does not relate to one or more services provided by the provider, reroute the user to a search engine. The one or more processors may be further configured to, in response to determining the query does not relate to one or more services provided by the provider, reroute the user to another user. The one or more processors may be further configured to, in response to determining the query does relate to one or more services provided by the provider, output a confirmatory signal.

In some embodiments, the system may further one or more processors configured to output a message to the user based on whether the additional information addresses the at least one prompt. In some examples, the message may contain one or more prompts of the at least one prompt that remain unaddressed by the query and the additional information. In some embodiments, the message may contain a confirmation notification.

In some embodiments, the machine learning model of the system may be a large language model. In some embodiments, the machine learning model of the system generates at least one prompt using a list of predetermined prompts for a provider of one or more services.

According to aspects of the disclosure, the disclosure relates to one or more non-transitory computer readable storage media encoding instructions that, when executed by one or more processors, cause the one or more processors to perform operations comprising receiving a user selection of a provider, receiving from a user a query associated with a request for a service, wherein the query is presented as a freeform entry, generating at least one prompt that corresponds to the query using a machine learning model, wherein the at least one prompt requests supplemental details related to the query from the user, outputting the at least one prompt to the user, receiving, in response to the at least one prompt, additional information from the user, determining using the machine learning model that the additional information does not address the at least one prompt, in response to determining the additional information does not address at least one aspect of the least one or more prompts, outputting at least one of the at least one prompt that remains unaddressed, and submitting the query and additional information to the selected provider.

DETAILED DESCRIPTION

This technology generally relates to techniques for validating freeform entries in web forms, such that providers of a service can receive an optimal amount of information from potential users of that service in the initial correspondence. The techniques may include receiving a query from a consumer and analyzing the query using natural language parsing of a machine learning model, such as an LLM. The machine learning model may generate a series of prompts related to the content of the query. The user may provide additional information based on the series of prompts. The techniques may further include analyzing the additional information to determine if the prompts were addressed. If the prompts were addressed, the techniques may include outputting a confirmation message to the user. The techniques allow for the user of the service to more effortlessly submit a desirable amount of information to the provider of the service.

This technology described herein includes techniques for enabling artificial intelligence to validate freeform entries in web forms. Artificial intelligence (AI) is a segment of computer science that focuses on the creation of models that can act with little to no human intervention. Artificial intelligence systems can utilize, for example, machine learning, which involves developing models that can infer outputs from data, natural language processing, which involves developing models that can analyze and generate human language, and computer vision, which involves generating models that can analyze and interpret images and videos. Artificial intelligence systems can include generative models that generate new content (e.g., images/video, text, audio, or other content) in response to input prompts or based on other information.

Figure 1:
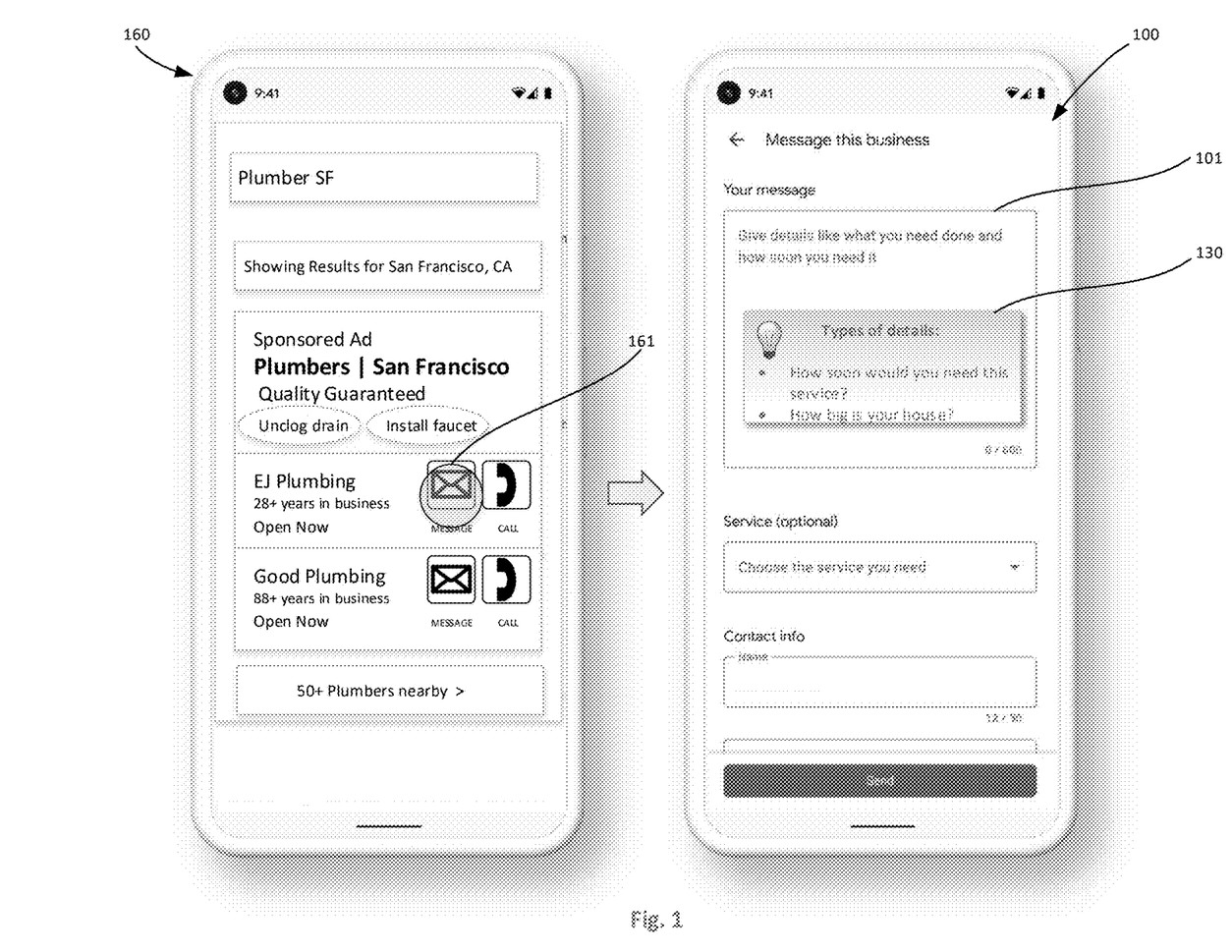
FIG. 1 illustrates an example graphic user interface of the prompt generation system according to aspects of the disclosure.

FIG. 1 depicts an example user experience in accessing a prompt generation system. In some examples, a user may use a mobile device 160 to access a search engine. The graphic user interface (GUI) 100 may include a message module 101 and a prompt generation module 130. The user may submit a query to the selected provider through the GUI using the message module 101. In some examples, the message module 101 may accept freeform data entry and contain freeform data prompts, such as "text area" or "text input" element. The prompt generation system may output prompts to the user through the GUI 100 at the prompt module 130.

Within the search engine, the user may search for the provider of their choice. For example, the user may search for a plumber in the San Francisco, California area by entering "plumber sf" in the search bar. The search engine may identify multiple providers who match this search request. In some examples, the provider may allow potential customers to submit questions using the prompt generation system. The user may contact a provider from the list of providers by selecting message icon 161 near the provider's online profile. For example, a user may select the message icon 161 next to the provider EJ Plumbing. The message icon 161 may open the GUI 100 on the mobile device 160.

Figure 2:
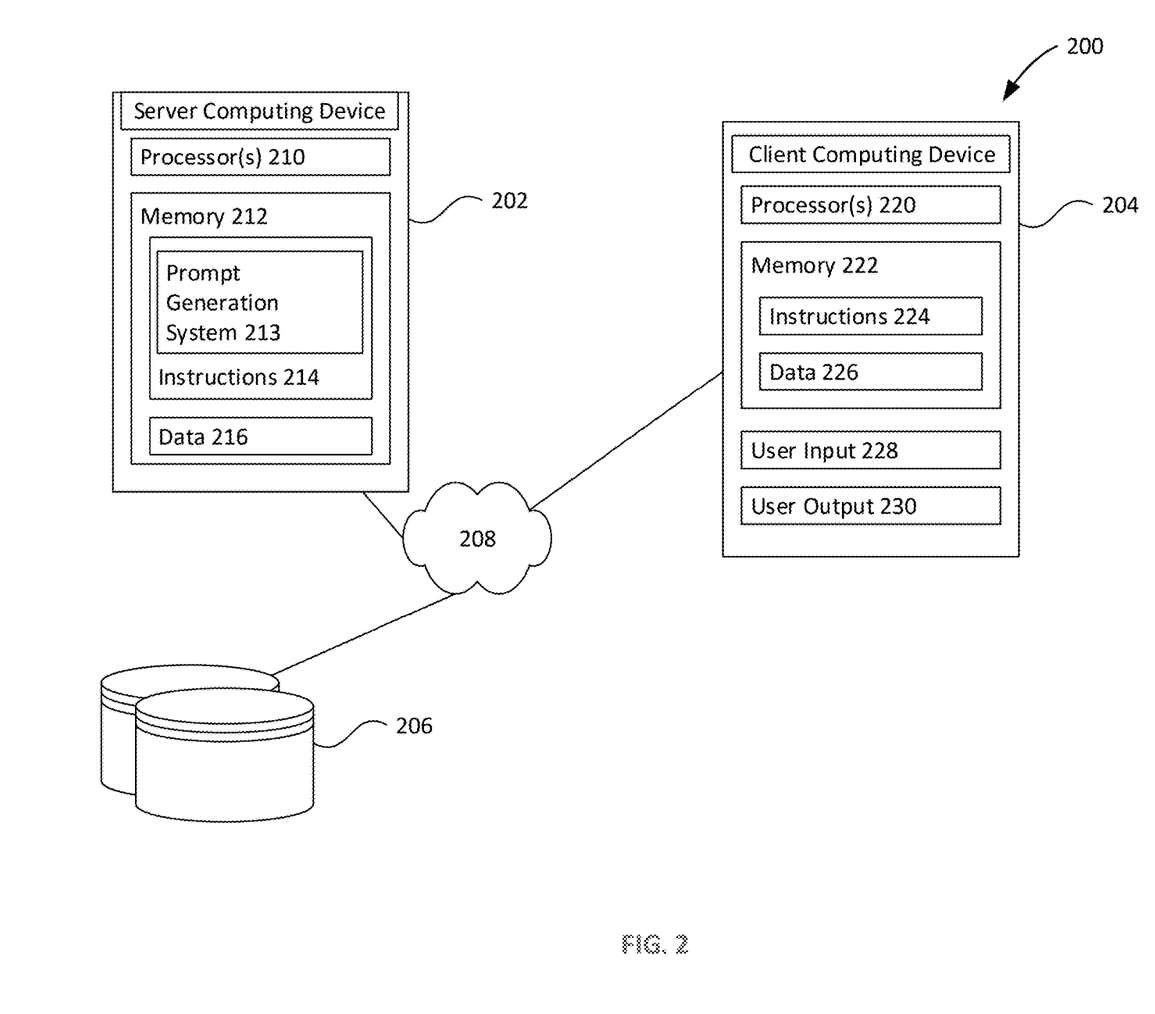
FIG. 2 depicts a block diagram of an example environment for implementing the prompt generation system according to aspects of the disclosure.

FIG. 2 depicts a block diagram of an example environment 200 for implementing the machine learning model. The prompt generation system 213 can be implemented on one or more devices having one or more processors in one or more locations, such as in server computing device 202. Client computing device 204 and server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer-readable medium capable of storing information, such as a hard drive, solid state drive, tape drive, optical storage, memory card, ROM, RAM, DVD, CD-ROM, write-capable, and read-only memories.

The server computing device 202 can include one or more processors 210 and memory 212. Memory 212 can store information accessible by the processors 210, including instructions 214 that can be executed by the processors 210. Memory 212 can also include data 216 that can be retrieved, manipulated, or stored by the processors 210. Memory 212 can be a type of non-transitory computer-readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that, when executed by the processors 210, cause the one or more processors to perform actions defined by the instructions 214. The instructions 214 can be stored in object code format for direct processing by the processors 210, or in other formats including interpretable scripts or collections of independent source code modules that are interpreted on demand or compiled in advance. The instructions 214 can include instructions for implementing a prompt generation system 213. The prompt generation system 213 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII, or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228 and a user output 230. The user input 228 can include any appropriate mechanism or technique for receiving input from a user, such as a keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers, or other audio outputs, a haptic interface, or other tactile feedback that provides non-visual and non-audible information to the platform user of the client computing device 204.

Although FIG. 2 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operations. The computing devices 202, 204 can each include one or more internal clocks providing timing information, which can be used for time measurement for operations and programs run by the computing devices 202, 204.

The server computing device 202 can be configured to receive requests to process data from the client computing device 204 on computing resources of a data center. For example, the environment 200 can be part of a computing platform configured to provide a variety of services to users, through various user interfaces and/or application programming interfaces (APIs) exposing the platform services. The variety of services can include conversational tasks associated with locating service providers, entering relevant information, and/or narrowing the content of a query. The client computing device 204 can transmit input data associated with requests for the prompt generation system 213. The prompt generation system 213 can receive the input data, and in response, generate output data including a response to the request.

As other examples of potential services provided by a platform implementing the environment 200, the server computing device 202 can maintain a variety of models in accordance with different constraints available at the data center. For example, the server computing device 202 can maintain different families for deploying models on various types of TPUs and/or GPUs housed in the data center or otherwise available for processing.

An example machine-learned model may include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some machine-learned models can include multi-headed self-attention models (e.g., transformer models).

The model can be trained using various training or learning techniques. The training can implement supervised learning, unsupervised learning, reinforcement learning, etc. The training can use techniques such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. A number of generalization techniques (e.g., weight decays, dropouts) can be used to improve the generalization capability of the models being trained.

The model can be pre-trained before domain-specific alignment. For instance, a model can be pre-trained over a general corpus of training data and fine-tuned on a more targeted corpus of training data. A model can be aligned using prompts that are designed to elicit domain-specific outputs. Prompts can be designed to include learned prompt values (e.g., soft prompts). The trained model may be validated prior to their use using input data other than the training data, and may be further updated or refined during their use based on additional feedback/inputs.

Figure 3:
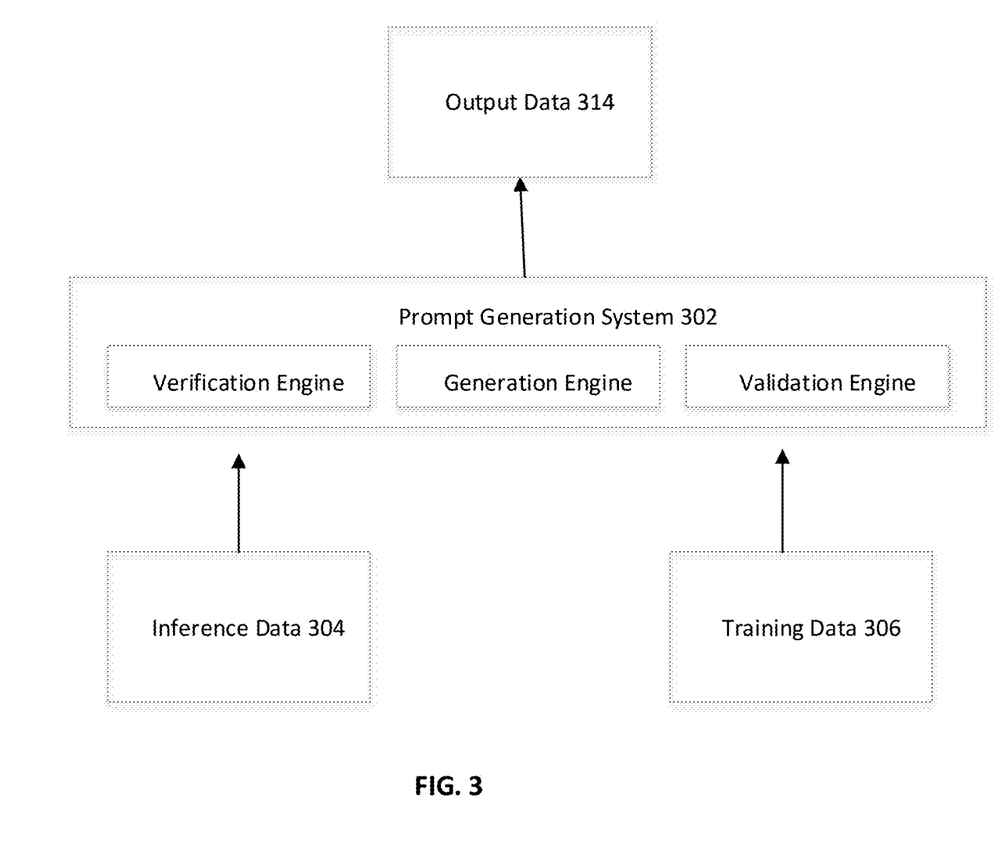
FIG. 3 depicts a block diagram of an example process performed by the prompt generation system according to aspects of the disclosure.

FIG. 3 depicts a block diagram of an example prompt generation system 302, which can be implemented on one or more computing devices. According to some examples, the prompt generation system 302 may utilize an ML model, such as an LLM. The prompt generation system may include a verification engine, a generation engine, and a validation engine. In some examples, the verification engine may determine if the content of the query matches the services offered by the selected provider. In some examples, the generation engine may generate prompts in response to the query entered by the user. In some examples, the validation engine may determine if the generated prompts have sufficiently answered the generated prompts.

The prompt generation system 302 can be configured to receive inference data 304 and/or training data 306 for use in generating prompts in response to a query received from a user attempting to reach a provider. The generated prompts may be provided in response to the content of the query received from the user. For example, when executing the prompt generation system 302, the query received from the user may be provided as input and at least one prompt may be provided as output. The prompt may be a generative question based on the content. The generated prompt may have a conversational tone, such that there is a question-and-answer type electronic communication session between the user and the prompt generation system 302, further described in connection with FIG. 6.

According to some examples, the prompt generation system 302 can receive the inference data 304 and/or training data 306 through a storage medium, such as remote storage connected to the one or more computing devices over a network. Inference data 304 and/or training data 306 may be provided as input through a user interface on a client computing device coupled to the prompt generation system 302.

The inference data 304 can include data associated with predicting prompts to queries as part of a plurality of submitted freeform message entries in web forms. The inference data 304 may include content, such as event data, context data, or the like, associated with freeform message entries. In some examples, the inference data 304 may include source text of the freeform entries as well as metadata for the source text, such as timestamp, event type, interventions, or the like.

The training data 306 can correspond to an artificial intelligence (AI) task, such as an ML task, for predicting responses to content received from a user, such as a task performed by a neural network. The training data can be split into a training set, a validation set, and/or a testing set. An example training/validation/testing split can be an 80/10/10 split, although any other split may be possible. The training data 306 can include example responses for certain queries received from users. For example, if the query received from the user is a request for home cleaning services, the example responses may be "How soon do you need this service?" or "How big is your house?" The training data 306 may be based on previous interactions among users, agents, providers, the prompt generation system 302, and/or other AI or ML models. For example, the content of completed, or terminated, queries and any responses from the provider may be provided as training data 306 for the prompt generation system 302.

The training data 306 can be in any form suitable for training a model, according to one of a variety of different learning techniques. Learning techniques for training a model can include supervised learning, unsupervised learning, and semi-supervised learning techniques. For example, the training data can include multiple training examples that can be received as input by a model. The training examples can be labeled with a desired output for the model when processing the labeled training examples. The label and the model output can be evaluated through a loss function to determine an error, which can be backpropagated through the model to update weights for the model. For example, if the machine learning task is a classification task, the training examples can be images labeled with one or more classes categorizing subjects depicted in the images. As another example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

The prompt generation system 302 may identify example prompts, based on previously provided prompts and/or manual input from the provider, provided based on the query received from the user. A provider may manually provide a list of prompts paired with common service queries. For example, a plumbing service provider may submit a list of prompts relating to information usually required when a potential customer is inquiring about unclogging a drain. This list may include prompts such as, "What drain is clogged?" "Have you tried to unclog the drain yourself?" "How long has the drain been clogged?". The prompt generation system 302 may identify the service requested from the query and output prompts from the provider inputted prompts.

From the inference data 304 and/or training data 306, the prompt generation system 302 can be configured to output one or more prompts related to providing at least one generative prompt in response to a query from a user. At least one prompt may be generated as output data 314. As an example, the output data 314 can be any kind of score, classification, or regression output based on the input data. Correspondingly, the AI or machine learning task can be a scoring, classification, and/or regression task for predicting some output given some input. For example, the prompt generation system 302 may generate a prompt given the query, e.g., content from a user. These AI or machine learning tasks can correspond to a variety of different applications in processing images, video, text, speech, or other types of data to provide an efficient and effective conversational experience among a user, an agent, and the prompt generation system 302.

As an example, the prompt generation system 302 can be configured to send the output data 314 for display on a client or user display. For example, the output data 314 may be provided for display on an interface. As another example, the prompt generation system 302 can be configured to provide the output data 314 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement the functionality described herein, for example, as performed by a system, engine, module, or model. The prompt generation system 302 can further be configured to forward the output data 314 to one or more other devices configured for translating the output data into an executable program written in a computer programming language. The prompt generation system 302 can also be configured to send the output data 314 to a storage device for storage and later retrieval.

Figure 4:
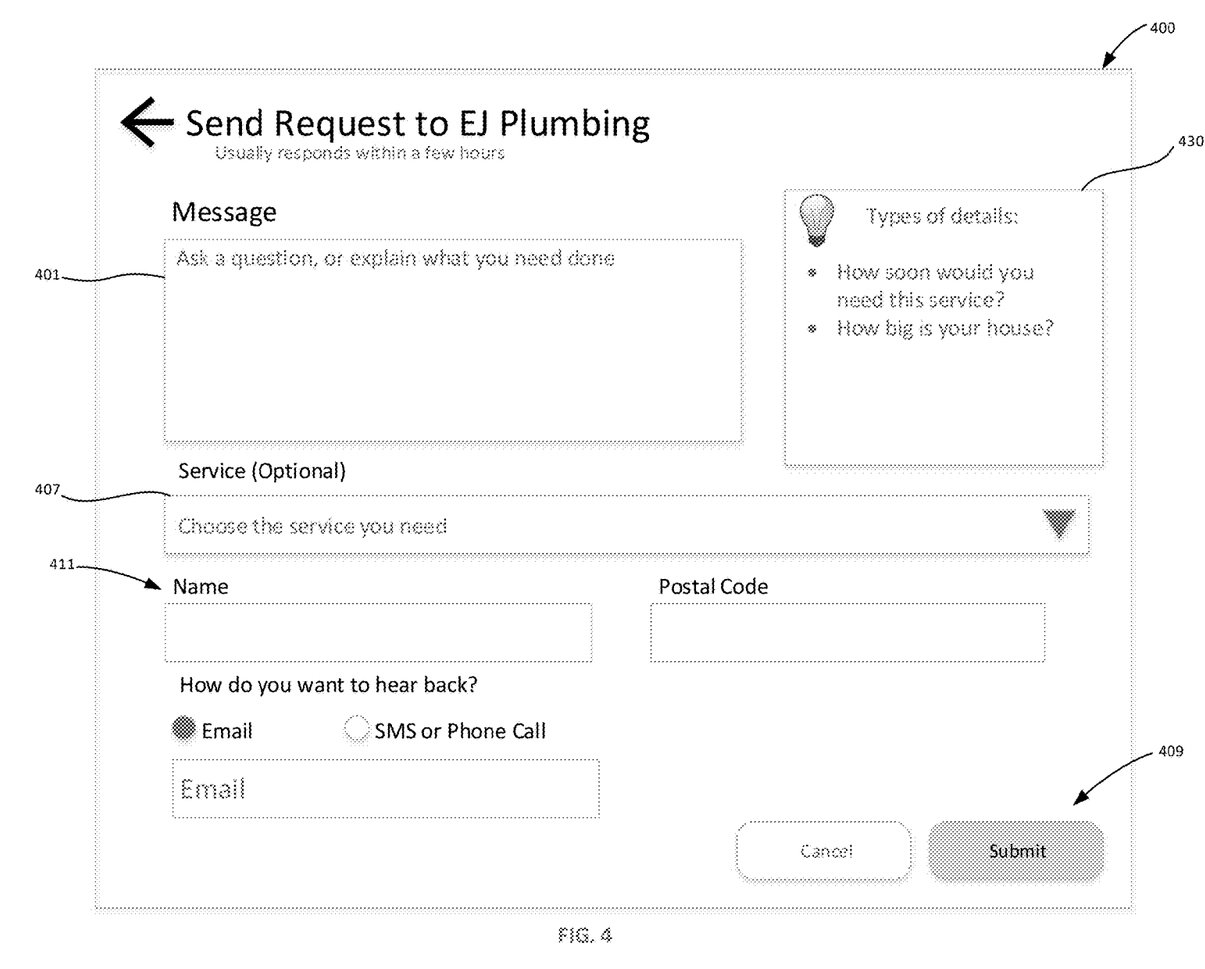
FIG. 4 depicts an example graphic user interface according to aspects of the disclosure.

FIG. 4 is an example graphic user interface (GUI) that would be shown on the user device of the user. The browser window 400 may include a message module 401 and a prompt module 430.

In some examples, the browser window 400 may also include a service module 407, entry buttons 409, and informational modules 411. The service module 407 may be a drop-down menu for the user to select the type of service requested from the provider. In some examples, there may be entry buttons 409, including but not limited to cancel and/or submit buttons. In some examples, there may be one or more informational modules 411 for the user to input contact information, such as name, postal code, email address, phone number, etc.

The techniques may employ a machine learning model to determine if the provider the user has selected is the correct provider for their query. The machine learning model may match the providers with the service requested in the query.

Figure 5A:
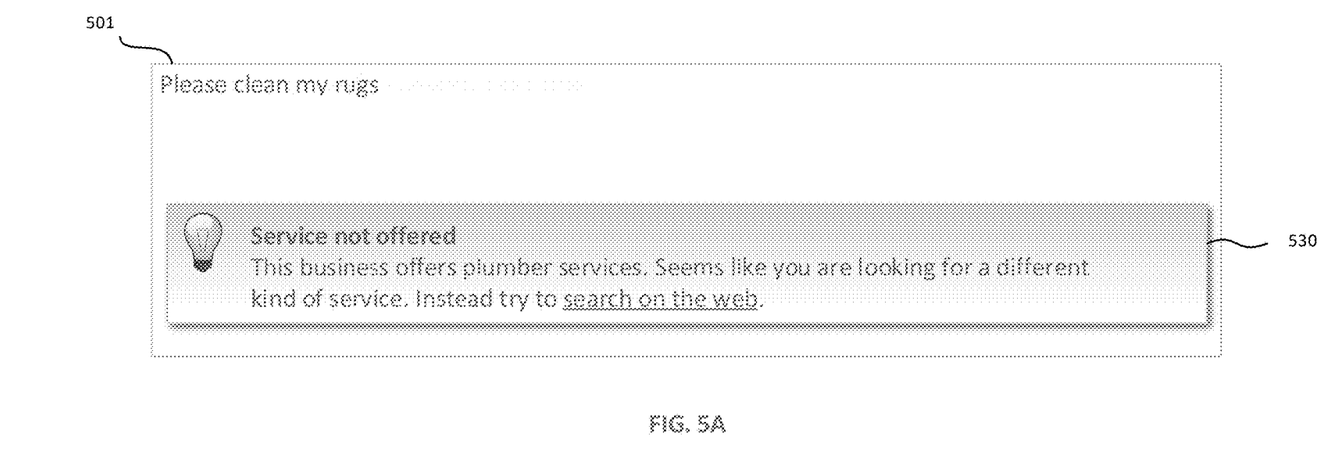
FIG. 5A illustrates example verification systems according to aspects of the disclosure.
Figure 5B:
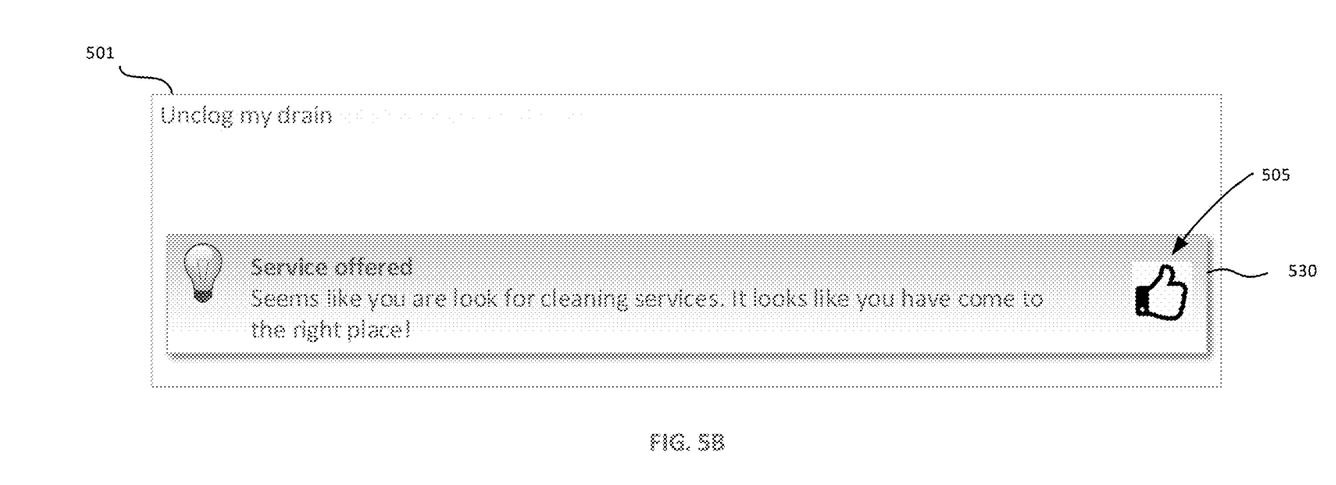
FIG. 5B illustrates another aspect of the example verification system according to aspects of the disclosure.

FIGS. 5A-5B illustrate example user interactions with the described systems, such as the prompt generation system 302 as depicted in FIG. 3. In FIG. 5A, the user has entered a query in message module 501. The system may determine the services offered by a provider by gathering information regarding the services offered by providers. In some examples, a provider, using a computing device, may input a list of services offered through an interface. The list of services may be stored in the data storage of a system and accessed by the machine learning model. In some examples, the machine learning model may determine the services a provider offers based on natural language systems analyzing the provider's particulars, such as name, website, description, etc.

The machine learning model may use natural language parsing to determine the requested service within the query. Based on the provider selected by the user and the service within the query, the machine learning model can output a verdict, such as "yes" or "no". As shown in FIG. 5B, in response to a 'yes' verdict, the technique may output a confirmatory icon 505 to the user, such as a checkmark or a thumbs up. As shown in FIG. 5A, in response to a 'no' verdict, the system may reroute the user to a search engine to select another provider. In some examples, in response to a "no" verdict, the system may reroute the user to another provider or otherwise indicate that the provider does not offer the requested service.

By using this first level of verification to ensure the user is submitting the inquiry to the proper provider, the computational efficiency of the system may be increased by reserving resources for properly directed queries. This increases computational efficiency by reducing the number of prompts generated by the system and reducing the inputs from the user, which decreases the amount of processing and network overhead associated with the query submission.

In some examples, the user may select a business to contact by selecting a message icon near the business's online profile. For example, a user may select the message icon next to the business EJ Plumbing. The user may enter a query in a message module 501 to submit to the provider. In the same example, a user may enter the query "Unclog my drain" into the message module 501. The machine learning model may first determine what type of services the selected business offers. In this example, EJ Plumbing may have provided a list of services to the system through an interface. The machine learning model may access this list when the user enters the query. Additionally, the machine learning model may determine the services of a business using natural language parsing of EJ Plumbing's business name, website, online description, etc.

In some examples, the machine learning model may next determine what type of services the user is interested in based on the content of the query. In this example, the system may use natural language parsing techniques of the machine learning model to determine based on the content of the query that the user is looking for plumbing services to unclog their drain. The machine learning model may further determine if the selected business offers the requested service from the query. The machine learning model may match the requested plumbing service with a service offered by EJ Plumbing.

As shown in FIG. 5B, if the machine learning model outputs a "yes" to this initial inquiry, the system may output a confirmatory signal 505 to the user in the prompt module 530. In some examples, the confirmatory signal may be an icon, a check mark, a thumbs up, a message bubble color change, etc. In some examples, there may be no direct confirmation given to the user if the service requested matches the services offered by the provider. As shown in FIG. 5A, if the machine learning model outputs a "no" to this initial inquiry to the prompt module 530, the user may be redirected, including but not limited to another business that is more suited to the service requested in the query.

Figure 6:
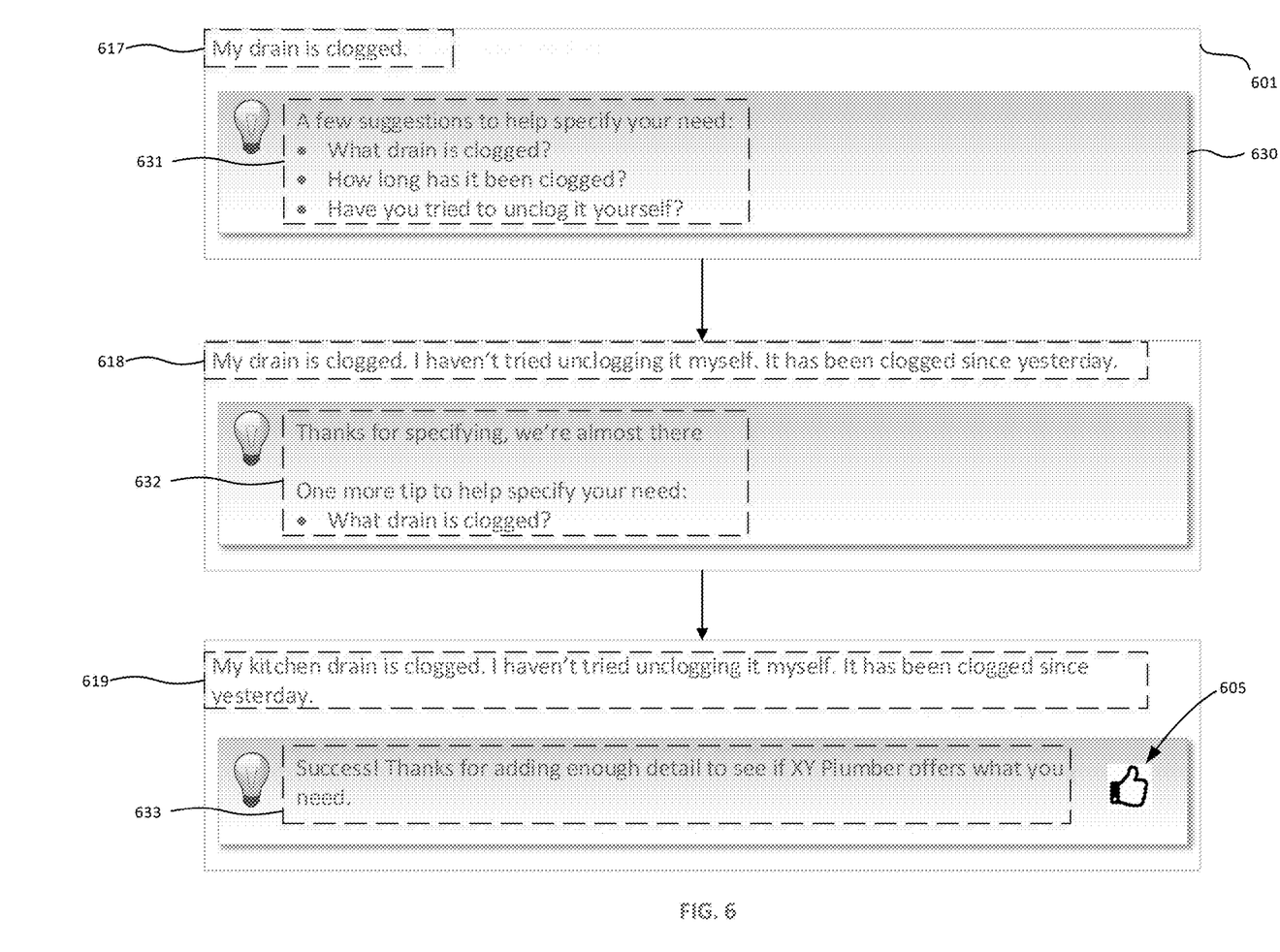
FIG. 6 illustrates example interactions between the user and the prompt generation system according to aspects of the disclosure.

FIG. 6 illustrates an example user experience with the prompt generation system as described herein. In the first step, the user has entered a query in the message box 601. In this example, the first query 617 is "My drain is clogged." The system may analyze the first query and output at least one prompt related to the first query 617 to the prompt module 630. In response to the user's query, the prompt generation system may use a machine learning model to generate prompts related to the content of the query. The purpose of the prompts is to gather additional information from the user for the provider. The prompts may be statements or questions.

In some examples, the prompts may be generated by using a machine learning model. In some examples, the prompts may be predetermined by a provider in relation to common queries. For example, through a web interface, a plumber may input a list of 10 questions they usually ask when a person calls with a clogged sink. This list may be stored in the data storage of the system and accessed by the machine learning model.

The machine learning model may analyze the query, determine the content of the query, and match prompts to the query. The machine learning model may further determine what information was included in the content of the query and what information is missing. With this information, the machine learning model may select from the list of prompts/questions that have yet to be answered. In some examples, the prompt generation module may output a list of prompts that are most important to the provider based on the content of the first query 617. As shown in the first step of FIG. 6, the prompt generation system outputs a first set of prompts 631 to the user interface in the prompt module 630: "What drain is clogged? How long has the drain been clogged? Have you tried to unclog the drain yourself?" The answers to these prompts will give the provider the additional information needed to properly service the user efficiently. The machine learning model may be trained to process, parse, and/or understand natural language, and may be prompted with instructions to respond to requests for services from users by asking for any information missing from the request.

As a second step of user experience with the prompt generation system, the user may provide additional information in response to the prompts. For example, the user may enter answers to the prompts as shown in the second query 618. The prompt generation system may recognize the additional information has been entered by the user in the message module 601. The prompt generation system may further analyze the additional information in the second query 618 to determine whether the prompts have been sufficiently addressed. The system may use reading comprehension techniques to analyze the additional information entered by the user. If the prompt generation system determines the prompts have not been sufficiently answered, the unaddressed prompts may be repeated to the user as shown in the second prompt 632. In some examples, even when the first set of prompts has been sufficiently addressed, the prompt generation system may still generate a second set of prompts to gather additional information from the user.

As the third step of the user experience with the prompt generation system, if the system is able to find some portion or combination of portions of the user's text that addresses one or more of the prompts, the system may register the user's query as sufficiently answered. If the prompt generation system determines the prompts have been sufficiently answered, a complete message may be output to the user, as shown in the third prompt 633. In some examples, the system may output a confirmatory signal 605, such as a thumbs up, check mark, color change of a portion of the interface, etc. The complete message may notify the user that they have provided enough information for the provider to adequately respond to their query. Once the user has addressed the prompts, the user may submit the query and the additional information to the provider.

An initial interaction between a user and a provider may require an exchange of multiple messages to gather the preliminary information needed to determine if the pair are a proper fit. In some examples, the provider may require preliminary information to be provided prior to assessing the query for a service, such as size of the service, timeliness of service or location of service. By using this level of validation to ensure the user has provided the ideal amount of information to the provider at this initial point of contact with the provider, the computational efficiency of the system may be increased by reserving resources required when improper or irrelevant information is provided with the initial queries. For example, by presenting automated and targeted prompts to the user at the initial point of contact, the system is able to gather preliminary information in one submission rather than a series of messages between the user and the server or between the user and the provider. This increases computational efficiency by reducing the number of inputs from the user, which decreases the amount of processing and network overhead associated with the query submission.

Figure 7A:
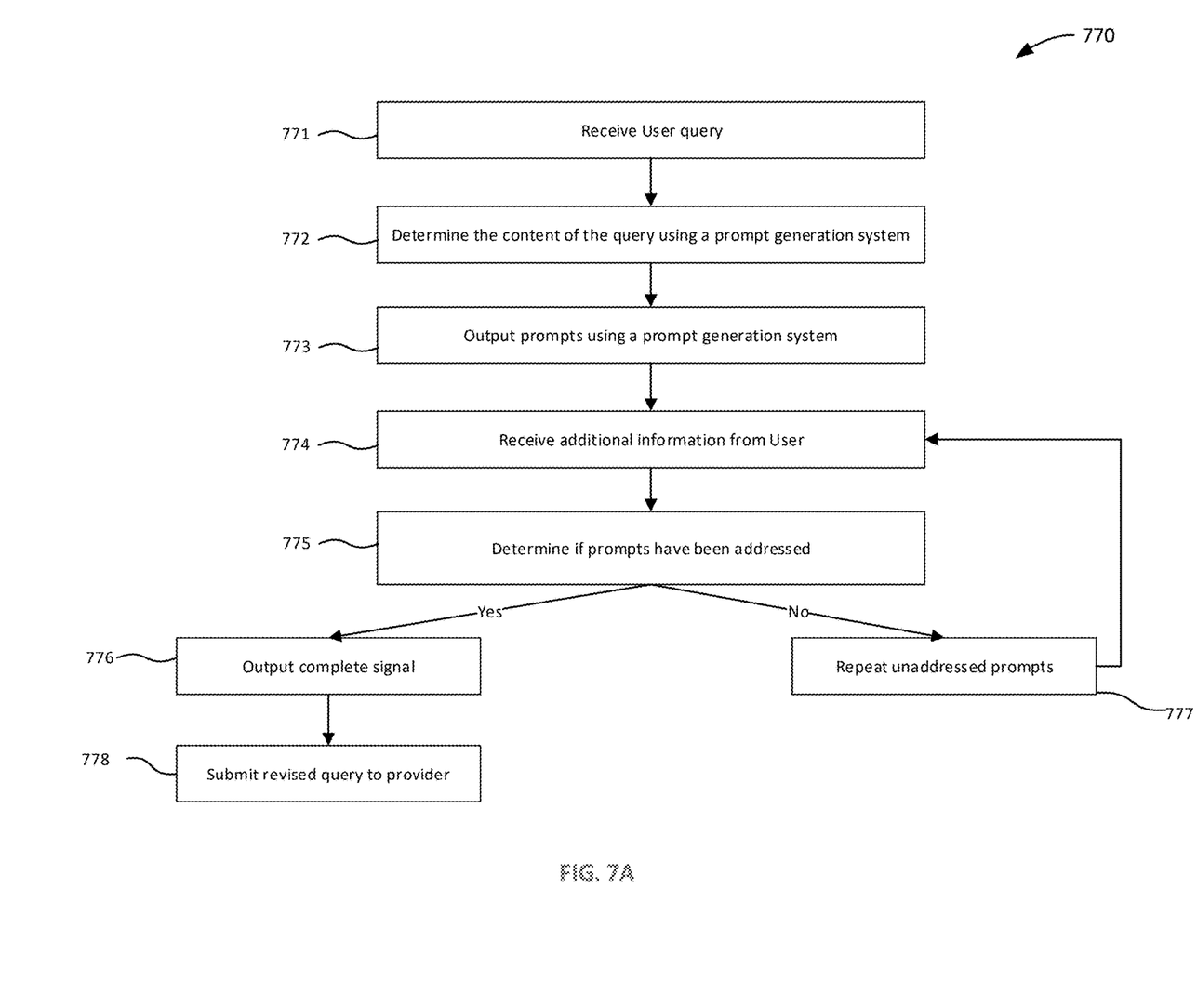
FIG. 7A depicts a flowchart outlining operations for generating prompts and processing user inputs according to aspects of the disclosure.

FIG. 7A is a flow chart of an example process 770 of the prompt generation system. The process may be performed by, for example, one or more devices having one or more processors in one or more locations, such as the prompt generation system 302 as depicted in FIG. 3.

The process 770 includes receiving 771 a user query by one or more processors. The query may be input by the user in a graphic user interface (GUI) on a client device. The query may relate to a requested service from the user. In some examples, the user may select a provider and input the query to solicit their services or products. Services may encompass any service or goods that a provider may offer.

The process 770 may further include determining 772 the content of the query. The content of the query may be determined using a prompt generation system equipped with a machine learning model, such as an LLM. For example, the machine learning model may determine the content in the query is related to plumbing services.

The process 770 may further include outputting 773 at least one prompt to the user through the GUI. The prompts may be generated by the prompt generation system. The prompts may relate to the query. More specifically, the prompts may be generated to gather more information from the user for the provider. In some examples, the prompts may be manually paired with common queries by providers or third-party agents. The system may output one or more prompts at a time.

The process 770 may further include receiving 774 additional information from the user. In response to the prompts, the user may input additional information or revise the original query. In some examples, the additional information may address questions of the prompts. The additional information may be inputted into the GUI by the user.

The process 770 may further include determining 775 if the prompts had been addressed by the additional information. The system may validate that the additional information provided by the user has sufficiently answered the prompts. The system may use machine learning models and natural language parsing to analyze additional information.

If the prompts have not been sufficiently addressed, the process 770 may further include repeating 777 the prompts that had not been addressed. If the prompts had been sufficiently addressed, the process 770 may further include outputting 776 a complete signal to the user through the GUI. This complete signal may be an icon such as a thumbs up or checkmark or a change in color, such as a portion of the GUI changes from white to green when the prompts have been addressed. Once the query has been revised with the additional information, the user may submit 778 the query to the provider. In some examples, the system may automatically submit the query once the system determines that prompts have been sufficiently addressed. In some examples, the user may submit the query without receiving the complete signal from the system.

Figure 7B:
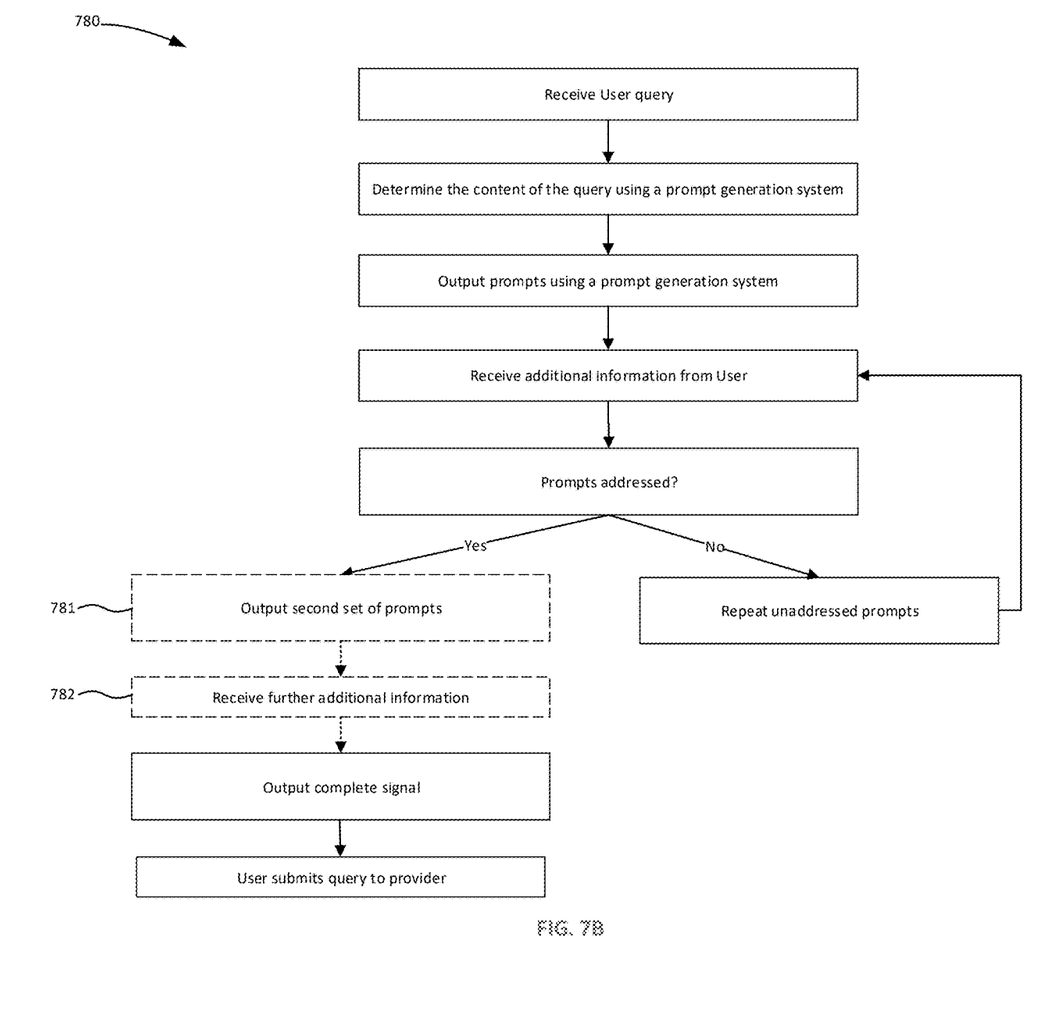
FIG. 7B depicts a flowchart outlining alternative operations for generating prompts and processing user inputs according to aspects of the disclosure.

FIG. 7B is an alternate flow chart of an example process 780 of the prompt generation system. The process 780 may contain many of the same features as the process 770 as described in FIG. 7A. Namely, in this process 780, the system may optionally output 781 a second set of prompts to the user. In some examples, a provider may set a predetermined amount of information required from the user. For example, a cleaning service provider may require an estimate of the size of the property to be cleaned for a service request. If the prompt generation system generates a first set of prompts that does not include the required inquiry, the system may output a second set of prompts to gather the required information. In some examples, the second set of prompts may include new prompts that are different prompts from the first set of prompts. In some examples, the second set of prompts may include a mixture of some of the same prompts from the first set of prompts and new prompts.

When the second set of prompts are output, the user may have the option to include additional information in response to the second set of prompts. In this example, the process may include receiving 782 further additional information from the user related to the second set of prompts. The process 780 may further determine if the second set of prompts has been addressed and output a confirmatory message. In some examples, the process may include additional sets of prompts to gather more information from the user, such as a third, fourth, or fifth set of prompts.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" or "module" refers to a software-based system, subsystem, or process that is programmed to perform one or more specific functions. The engine or module can be implemented as one or more software modules or components or can be installed on one or more computers in one or more locations. A particular engine or module can have one or more computers dedicated thereto, or multiple engines or modules can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing freeform data entry on web forms, comprising:
    receiving, by one or more processors, a user selection of a service provider identified through a graphical user interface;
    receiving, by the one or more processors, from the user, a query associated with a request for a service, wherein the query is presented as a freeform entry;
    parsing the freeform text entry using natural language parsing by a machine learning model;
    verifying, by the one or more processors based on the parsing of the freeform text entry, whether the selected service provider offers the service requested by query prior to submitting the query to the service provider;
    generating, by the one or more processors, at least one generative prompt that corresponds to the query using natural language parsing by a machine learning model, wherein the at least one generative prompt requests supplemental details related to the query from the user in a communication session between the user and the one or more processors;
    outputting, by the one or more processors, the at least one generative prompt to the user;
    receiving, in response to the at least one generative prompt, by the one or more processors, additional information from the user;
    determining, by the one or more processors using the machine learning model, that the additional information does not address at least one aspect of the at least one generative prompt;
    in response to determining the additional information does not address at least one aspect of the at least generative prompt, outputting during the communication session the at least one generative prompt that remains unaddressed; and
    in response to determining during the communication session that the additional information sufficiently addresses the at least one prompt, submitting, by the one or more processors, the query and additional information to the selected provider.

2. The method of claim 1, further comprising determining, by the one or more processors, whether the query associated with the request for a service relates to one or more services provided by the selected provider.

3. The method of claim 2, wherein, in response to determining the query does not relate to the one or more services provided by the selected provider, rerouting, by the one or more processors, the user to a search engine.

4. The method of claim 2, wherein, in response to determining the query does not relate to the one or more services provided by the selected provider, rerouting, by the one or more processors, the user to another provider.

5. The method of claim 2, wherein, in response to determining the query relates to the one or more services provided by the provider, outputting, by the one or more processors, a confirmatory signal.

6. The method of claim 1, further comprising outputting, by the one or more processors, a message to the user based on whether the additional information addresses the at least one generative prompt.

7. The method of claim 6, wherein the message contains one or more prompts of the at least one generative prompt that remain unaddressed by the query and the additional information.

8. The method of claim 6, wherein the message contains a confirmation notification.

9. The method of claim 1, wherein the machine learning model is a large language model.

10. The method of claim 1, wherein the machine learning model generates the at least one generative prompt using a list of predetermined prompts from a provider of one or more services.

11. A system, comprising:
    one or more processors, the one or more processors configured to:
    receive a user selection of a provider;
    receive from the user, a query associated with a request for a service, wherein the query is presented as a freeform entry;
    parse the freeform text entry using natural language parsing by a machine learning model;
    verify, based on the parsing of the freeform text entry, whether the selected service provider offers the service requested by query prior to submitting the query to the service provider;
    generate at least one generative prompt that correspond to the query using natural language parsing by a machine learning model, wherein the at least one generative prompt requests supplemental details related to the query from the user in a communication session between the user and the one or more processors;
    output the at least one prompt to the user;
    receive additional information from the user in response to the at least one generative prompt;
    determine, using the machine learning model, that the additional information does not addresses at least one aspect of the at least one prompt;
    in response to determining the additional information does not address at least one aspect of the at least one generative prompt, output during the communication session the at least one generative prompt that remains unaddressed; and
    in response to determining during the communication session that the additional information sufficiently addresses the at least one prompt, submit the query and additional information to the selected provider.

12. The system of claim 11, wherein the one or more processors are further configured to determine whether the query associated with the request for a service relates to one or more services provided by a provider.

13. The system of claim 11, wherein, in response to determining the query does not relate to the one or more services provided by the provider, the one or more processors are further configured to reroute the user to a search engine.

14. The method of claim 11, wherein, in response to determining the query does not relate to the one or more services provided by the provider, the one or more processors are further configured to reroute the user to another provider.

15. The system of claim 11, wherein, in response to determining the query relates to the one or more services provided by the provider, the one or more processors are further configured to output a confirmatory signal.

16. The system of claim 11, wherein the one or more processors are further configured to output a message to the user based on whether the additional information addresses the at least one generative prompt.

17. The system of claim 16, wherein the message contains one or more prompts of the at least one generative prompt that remain unaddressed by the query and the additional information.

18. The system of claim 16, wherein the message contains a confirmation notification.

19. The system of claim 11, wherein the machine learning model generates the at least one generative prompt using a list of predetermined prompts from the provider.

20. One or more non-transitory computer-readable storage media encoding instructions that, when executed by one or more processors, cause the one or more processors to perform operations comprising:

receiving a user selection of a provider;

receiving from the user, a query associated with a request for a service, wherein the query is presented as a freeform entry;

parsing the freeform text entry using natural language parsing by a machine learning model;

verifying, based on the parsing of the freeform text entry, whether the selected service provider offers the service requested by query prior to submitting the query to the service provider;

generating at least one generative prompt that corresponds to the query using natural language parsing by a machine learning model, wherein the at least one generative prompt requests supplemental details related to the query from the user in a communication session between the user and the one or more processors;

outputting the at least one generative prompt to the user;

receiving additional information from the user in response to the at least one generative prompt;

determining, using the machine learning model, whether the additional information does not addresses at least one aspect of the at least one prompt; and     in response to determining the additional information does not address at least one aspect of the at least one generative prompt, outputting the at least one generative prompt that remains unaddressed during the communication session; and     in response to determining during the communication session that the additional information sufficiently addresses the at least one generative prompt, submitting the query and additional information to the selected provider.

\* \* \* \* \*